United States Patent [19]

Wei et al.

[11] Patent Number: 4,726,651
[45] Date of Patent: Feb. 23, 1988

[54] OPTICAL FIBERS HAVING PIEZOELECTRIC COATINGS

[75] Inventors: Ta-Sheng Wei, Woodbury; Robert M. Swinehart, Maplewood, both of Minn.; William G. French, Hudson, Wis.

[73] Assignee: Minnesota Mining and Manufacturing Company, St. Paul, Minn.

[21] Appl. No.: 341,235

[22] Filed: Jan. 21, 1982

[51] Int. Cl.$^4$ .......................... G02B 6/02; G02B 6/16
[52] U.S. Cl. ..................................... 350/96.29
[58] Field of Search ......................... 350/96.29, 96.13

[56] References Cited

U.S. PATENT DOCUMENTS 4,068,191  1/1978  Zemon et al. .................. 350/96.13
4,147,407  4/1979  Eichenbaum et al. ............ 350/96

OTHER PUBLICATIONS

Piezoelectricity and Pyroelectricity of PVF$_2$...; Bamji et al.; *Journal of Polymer Science*, vol. 18; 1980, pp. 1945–1954.
Pyroelectricity in Polymer Blends of PVF$_2$; Lee et al.; *American Chemical Society*; vol. 11, No. 1; Jan.–Feb. 1978; 171–175.
1980 Ultrasonics Sym. Proceedings, 710–712, vol. 2, (PVF$_2$ Phase Shifters and Modulators for Fiber Optic Sensor Systems), by E. F. Carome & K. P. Koo, Optical Fiber Telecommunications, S. E. Miller and A. G Chynoweth, Academic Press, 1979, Chapter 8 & 10.
T. G. Giallorenzi, Optics and Laser Technology, Apr. 1981, vol. 13, pp. 73–79.
R. N. Capps, "Optical Fiber Coatings", Ind. Eng. Chem. Prod. Res. Div., 1981, 20, 599–608.
H. Lee, R. E. Salomon, and M. M. Labes, "Pyroelectricity in Polymer Blends of Poly(Vinylidene Fluoride)", vol. XI, No. 1, Jan.–Feb. 1978, p. 171, Macromolecules, Am. Chem. Soc.
S. S. Bamji, K. J. Koo and M. M. Perlman, Journal of Polymer Science, Polymer Physics Edition, vol. XVIII, pp. 1945–1954, (1980).

*Primary Examiner*—William L. Sikes
*Assistant Examiner*—Robert E. Wise
*Attorney, Agent, or Firm*—Donald M. Sell; James A. Smith; Gerald F. Chernivec

[57] ABSTRACT

Optical fibers coated with a blend of poly(vinylidene fluoride) and at least one other polymer are poled to make the coating piezoelectric, whereby the optical fiber will undergo strain when the coating is exposed to an electric field.

8 Claims, 2 Drawing Figures

OPTICAL FIBERS HAVING PIEZOELECTRIC COATINGS

BACKGROUND OF THE INVENTION

Prior-art fiber-optic sensors and optical communication systems have used piezoelectric devices to impose a strain on optical fibers and thereby modulate signals transmitted by the fibers. Particularly E. F. Carome and K. P. Koo, IEEE Ultrasonics Sym., p. 710 (1980), report a construction in which a length of optical fiber is adhered to a length of oriented poly(vinylidene fluoride) ($PVF_2$) piezoelectric film. The article further notes that since $PVF_2$.

> has the potential of being used as a protective jacket, ... [the $PVF_2$] might be formed as an integral part of an optical fiber.

Carome et al do not explain how $PVF_2$ would be applied as a jacket on an optical fiber, and the characteristics of $PVF_2$ present an obstacle to such use. $PVF_2$ films as initially prepared have an alpha-phase crystalline structure that is not susceptible to piezoelectric properties. To give the films piezoelectric behavior, the films must be stretched, whereupon they assume a beta-phase crystalline structure that may be subsequently poled to a piezoelectric condition.

Theoretically an oriented poled film of $PVF_2$ could be wrapped and bonded around an optical fiber, but that would be difficult to do, would require complex equipment, and generally would be economically unattractive. Coating $PVF_2$ on the optical fibers would not be useful, because the optical fiber could not be subsequently stretched sufficiently to orient the $PVF_2$ into a betaphase crystalline structure; nor is any method known for poling $PVF_2$ coated on a small optical fiber (poling has generally been performed on flat films, usually with a metal electrode carried on the film).

A different teaching of a piezoelectric coating on an optical fiber is found in Davies et al, U.S. Pat. No. 4,002,896. After first describing constructions in which an optical fiber is either wrapped around a cylinder of piezoelectric material such as lead zirconate titanate or is bonded to a piezoelectric plate with adhesive, the patent suggests that a thin film of piezoelectric material could be vapor-deposited onto a fiber, or more specifically onto a metal layer previously coated over a plastic-cladded optical fiber.

The patent does not state what piezoelectric material is to be coated onto the fiber and there is no apparent useful material for the purpose. Lead zirconate titanate is the only piezoelectric material mentioned in the patent, but vapor-deposition of such a material would require high temperatures that would damage the plastic cladding on the fiber. If lead zirconate titanate were to be vapor-coated directly onto a glass-cladded optical fiber, the high-temperature processing would tend to damage the surface of the optical fibers and reduce the fiber strength. Also, previous applications of inorganic coatings on optical fibers have yielded fiber with poor optical properties because of the rough polycrystalline nature of the coating. Further, vapor-deposition of inorganic material would be a slow, cumbersome and difficult process. All in all, this patent leaves the art with a desire for a piezoelectric coated optical fiber but no apparent way to achieve it.

SUMMARY OF THE INVENTION

The present invention provides optical fibers having effective piezoelectric coatings. The coatings on the fibers comprise a blend of $PVF_2$ and at least one polymer which is miscible with the $PVF_2$ at a temperature above the latter's melting point. Such coatings can be applied to the optical fiber, as by coating from a solution or melt of the blend, heated so as to render the coating substantially amorphous, and cooled at a rate and to a temperature sufficient to prevent the crystallization of the coating.

Further, we have succeeded in poling the coating by a corona technique in which the coated fiber is supported over a metal substrate, with a charging electrode disposed physically above the fiber and maintained at a high electric potential with respect to the metal substrate. The resultant poled coating exhibits piezoelectric and pyroelectric properties and offers a useful way to modulate light signals transmitted through the fiber.

DETAILED DESCRIPTION

Figure 1:
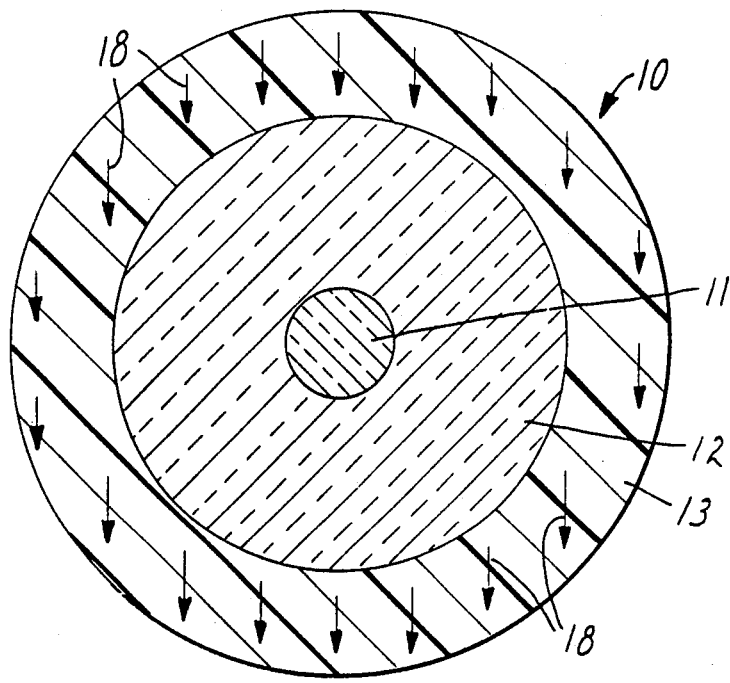
FIG. 1 is an enlarged sectional view through a coated optical fiber of the invention.

FIG. 1 shows an illustrative coated fiber of the invention 10 comprising a core 11, cladding 12, and piezoelectric coating 13. The invention is useful with any optical fiber on which a piezoelectric or pyroelectric coating is desired. Optical fibers can be made from a variety of light-transmitting materials, typically glass, and by a variety of techniques. See Optical Fiber Telecommunications, S. E. Miller and A. G. Chynoweth, Academic Press, 1979, Chapter 8. The invention is particularly useful with single-mode optical fibers useful in a Mach-Zehnder fiber interferometer in optical fiber sensor applications (T. G. Giallorenzi, Optics and Laser Technology, April, 1981, Vol. 13, p. 73–79). The invention is also useful with mutlti-mode fibers.

The fibers can be coated during the course of fiber manufacture, by coating apparatus located in-line with the fiber-drawing apparatus, or after fiber manufacture. Useful coating apparatus typically comprises a coating reservoir, an applicator die, and a means of accelerating the curing or drying of the coating (Optical Fiber Telecommunications supra, Chapter 10; R. N. Capps, "Optical Fiber Coatings," Ind. Eng. Chem. Prod. Res. Div., 1981, 20, 599–608). The fibers may be coated directly with the blend $PVF_2$-polymer material, or a primer or other coating may be first applied to the fibers. Also, coatings may be applied over the applied $PVF_2$-polymer blend. The coatings of the blend material need not be thick and usually are between 10 and 100 micrometers thick on a 100-micrometer-diameter fiber, though thicker coatings are desired for some uses.

The $PVF_2$ utilized in the coating material can be any of those types which are commercially available. Exemplary materials include Kureha 1100 (available from Kureha Chemical), Solvay 1012 (available from Soltex Polymer Corp.), and Kynar 301-F (available from Pennwalt Corp.).

The other polymers suitable for use in the polymer blend include those which are miscible with $PVF_2$ at a temperature above the melting point of the $PVF_2$. Miscibility herein means that the polymer blend exhibits a single glass transition temperature. Exemplary polymers include polyacrylates, e.g., polymethylacrylate; polymethacrylates, e.g., polymethylmethacrylate (PMMA) and polyethylmethacrylate; and polyvinylacetate.

In order to optimize the piezoelectric and/or pyroelectric characteristics of the polymer coating, the blend should contain at least about 50 weight-percent $PVF_2$, the balance being the polymers exemplified above.

In the preparation of the polymer coating comprising the aforementioned blend, the polymers can be intimately mixed (in batch mixers such as the Banbury-type and roll-mill type or in continuous mixers such as single and twin screw extruders) at an elevated temperature, typically called melt-blending, until a uniform homogeneous mixture is obtained, which is then coated onto the fibers, e.g., by melt-extrusion techniques. Alternatively, the polymers can be dissolved in a suitable solvent for application by solvent coating techniques.

The coating is heated to remove solvent, in the case of solvent-coating, and then heated to a temperature above the melting point of the $PVF_2$ for sufficient time to render the coating substantially amorphous. Following this heating step, the coating is cooled at a rate and to a temperature sufficient to prevent the crystallization of the coating.

Figure 2:
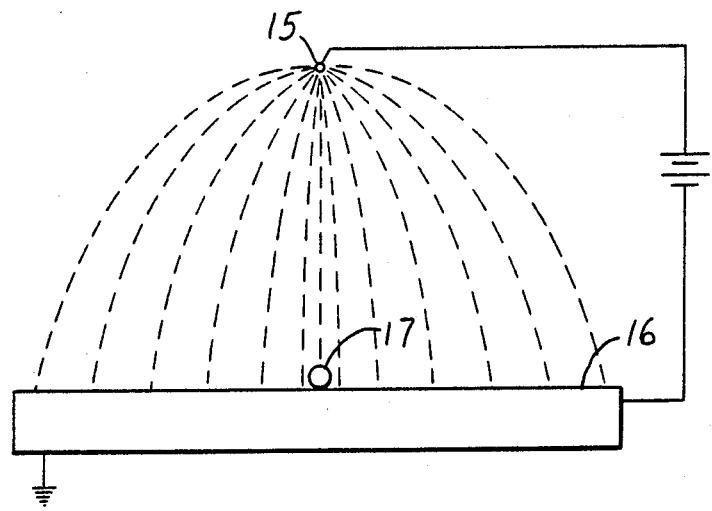
FIG. 2 is a schematic diagram of apparatus useful for poling the coating on the fiber.

Apparatus for the preferred "corona poling" procedure is shown in FIG. 2 and comprises a thin wire 15 that serves as a charging electrode, a grounded plate 16, and a coated fiber 17 laid on the plate 16. With the wire 15 maintained at a high potential, such as 20 kilovolts, ions are showered on the top surface of the fiber. When the fiber is heated during the charging process, a larger piezoelectric effect has been observed, presumably because the elevated temperatures facilitate reorientation of electric dipoles within the coating. Various alternative arrangements besides that shown in FIG. 2 can be used. For example, a heated roller may be used instead of the plate 16.

The exact mechanism occurring during corona poling is not known. Perhaps ions are injected into the coating and trapped there, or perhaps the ions collected on the surface provide an orienting force that first orients the $PVF_2$ polymer chains to the beta crystalline form and then further orients the molecules to align a higher proportion of electric dipoles on the polymer chain. The mechanism is understood to involve conversion of the substantially amorphous polymeric $PVF_2$ to the beta crystalline form under the influence of the electric field, without necessity for mechanical orientation of the coating. Maintaining the blend in the substantially amorphous form prior to polarization avoids the formation of the alpha crystalline form.

"Contact poling" of the fiber may also be used, though it is presently less preferred. In such a procedure the coated fiber can be placed between and in contact with two metal electrodes and the surrounding void around the fiber filled with high-dielectric-constant, high-dielectric-strength films such as $PVF_2$ films or polytetrafluoroethylene films, or semiliquid or liquid materials such as liquid fluorocarbon compounds.

Arrows 18 on the coating in FIG. 1 schematically illustrate the average arrangement of local dipole moments understood to be produced in the blend coatings by the described corona or contact poling methods. As may be seen, on average, the dipole moments tend to be aligned in a generally parallel pattern, extending transversely through the coating on the fiber. The directionality can be confirmed or detected by measuring the different piezoelectric effects obtained as a function of the angle of an applied electric field. The directionality of the effect is of utility to distinguish between electric fields of different directionality.

Radial poling can also be used for some applications. For example, a metal electrode can be applied around the fiber prior to the $PVF_2$-polymer blend being applied, whereupon a poling field can be applied radially through the coating.

The invention will be further illustrated by the following examples. Measurements were conducted using a Mach-Zehnder interferometer in which a He-Ne laser beam is split by an optical beam splitter and focused by 20x microscope objectives into two single-mode optical fibers: a reference fiber and the test fiber. The output of the two fibers is recombined at a second beam splitter. The resulting interference pattern falls on a photodetector behind a pinhole. As the phase difference between the fibers changes, a "fringe shift" is seen and the bright and dark fringes are detected by changes in the photocurrent from the detector.

To test for the desired phase modulation, a sinusoidal electric field (frequency $\omega$) is applied across a certain length of the test fiber. The phase difference $\phi(t)$ between the two output beams is $$\phi(t) = \phi_o + kX_o \sin \omega t,$$

where $\phi_o$ is the "static" phase difference and $X_o$ is the amplitude of sinusoidal optical path difference. For piezoelectric materials, the path difference is linear with applied field and $X_o$ corresponds to the maximum difference when the oscillating field is at a maximum. As stated in the above-mentioned article by Carome et al, the photocurrent from the detector is $$I(t) = I_o \cos \phi_o \cdot [J_o(kX_o) + 2\Sigma J_{2n}(kX_o)\cos(2n\omega t)] - I_o \sin \phi_o [2\Sigma J_{2n+1}(kX_o)\sin((2n+1)\omega t)],$$

where $J_n$ is the Bessel function of order n.

The output of the silicon photodetector is processed by a spectrum analyzer. The ideal signal will appear as a series of spikes at the drive frequency, $\omega$, and at all multiples of $\omega$. The height of the spikes will be determined by the amplitude, $X_o$, of the piezoelectric length change, and by the static phase, $\phi_o$. Since $\phi_o$ drifts due to temperature variations, vibrations, etc., it is not possible to determine the length change, $X_o$, from the value of the peak heights. Also, since all odd frequency ($\omega$, $3\omega$, $5\omega$) spikes have a height determined by $\cos \phi_o$, the ratio of the odd frequency spikes is independent of this drift. Thus, by measuring the ratio of the spike at $3\omega$ to the one at $\omega$ the phase shift can be calculated exactly. This ratio can be calculated for several applied voltages and compared to the expected ratio $J_3/J_1$ from the Bessel functions. In addition, the phase shift at the zeroes of a Bessel function can be determined: when the phase shift nears a zero, the output of that harmonic drops, showing a local minimum in the plot of output versus applied voltage. By identifying all the zeroes, the phase shift and the corresponding electric field are determined.

An interesting consequence of this measurement method is that if only electrostriction (quadratic with electric field) occurs, rather than piezoelectric constriction (linear with electric field), spikes appear only at even multiples of the drive frequency. When reference is made herein to a response that is linear with respect to an electric field, it is meant that the optical phase shift (in radians) induced by an electric field (in volts per meter) for a fiber of a given length (in meters) is proportional to the multiplication product of the field times the length of fiber. The proportionality constant (in radians per volt) is a convenient measure of a particular modulator construction.

Comparative Example A

A single-mode 96-micrometer-diameter optical fiber comprising an 8-micrometer-diameter core of $GeO_2$-doped $SiO_2$ and a 44-micrometer-thick two-layer cladding, the innermost layer comprising $SiO_2$ doped with F and $P_2O_5$ and the outermost layer comprising pure $SiO_2$, was adhered to an oriented polarized film comprising 100 percent $PVF_2$. The output compared to the expected $J_3/J_1$ ratio was plotted, and a sensitivity of $2.3 \times 10^{-5}$ radians/volt calculated from the plot. This is lower than the result reported by Carome et al ($10.4 \times 10^{-5}$ radians/volt), which may be accounted for by differences in sample configuration.

EXAMPLE 1

A preform for single-mode fibers was prepared by conventional modified chemical vapor deposition (MCVD) techniques. The preform was drawn into 96-micrometer-diameter fibers, having a core and cladding as described in Comparative Example A. On-line with the drawing operation, the fibers were coated with a $PVF_2$-PMMA blend material to a 150 micrometer overall diameter using a conventional fiber coating applicator. The coating was prepared by dissolving 70% $PVF_2$ and 30% PMMA in dimethyl formamide (DMF) solvent at a concentration of 20% polymers and 80% solvent, the concentrations being chosen to provide a suitable viscosity for the coating operation. After the coating solution was applied, the fiber was passed through an oven at approximately 230° C. to evaporate the DMF solvent. Before further testing or processing, the fibers were reheated to 218° C. and quenched in air to insure that the coating was amorphous.

The fibers as originally coated showed no piezoelectric activity. When such fibers were placed in the described measurement interferometer and an electric field applied between the two parallel plates, only the $2\omega$ electrostriction signals were observed at high fields.

The fibers were poled in corona poling apparatus comprising a 25-micrometer-diameter wire held at $-20$ kV five centimeters from a grounded metal plate. The test fiber was laid on the plate and the ends of the fiber taped to the plate. The fiber was therefore showered from above with negative ions until it was highly charged. While this arrangement and electric field were maintained, the fiber was heated to 110° C. and then cooled.

The signal ratio at $\omega$ and $3\omega$ was plotted versus applied field, and a sensitivity of $1.3 \times 10^{-5}$ radians/volt was calculated from this data. The sensitivity can also be determined from the zeroes of corresponding Bessel functions, from which a value of $1.5 \times 10^{-5}$ radians/volt was obtained.

Comparative Example B

Example 1 was repeated, including the poling step, except that the fiber was coated with pure $PVF_2$. The coated fiber did not demonstrate linear piezoelectric response, but rather only the $2\omega$ electrostriction response at high fields.

What is claimed is:

1. An electric field sensor comprising an optical interferometer in which at least one arm of this interferometer comprises an optical fiber carrying a coating that comprises a blend of poly(vinylidene fluoride) and at least one polymer which is miscible with said poly(vinylidene fluoride) at a temperature above the melting point thereof, said coating being piezoelectric after poling, whereby the fiber will be strained when the coating is exposed to an electric field, wherein the coating has been poled and is piezoelectric.

2. Optical fiber of claim 1 wherein poly(vinylidene fluoride) comprises at least about 50 percent by weight of said blend.

3. Optical fiber of claim 2 wherein said polymer is selected from the group consisting of polyacrylates, polymethacrylates, and polyvinylacetate.

4. Optical fiber of claim 1 wherein said polymer is selected from the group consisting of polyacrylates, polymethacrylates and polyvinylacetate.

5. An electric field sensor comprising the optical interferometer in which at least one arm of the interferometer comprises an optical fiber carrying a coating that comprises a blend of poly(vinylidene fluoride) and at least one polymer which is miscible with said poly(vinylidene fluoride) at a temperature above the melting point thereof, said coating being piezoelectric after poling, whereby the fiber will be strained when the coating is exposed to an electric field, wherein the coating has been transverely poled and is piezoelectric.

6. Optical fiber of claim 5 wherein poly(vinylidene fluoride) comprises at least about 50 percent by weight of said blend.

7. Optical fiber of claim 6 wherein said polymer is selected from the group consisting of polyacrylates, polymethacrylates, and polyvinylacetate.

8. Optical fiber of claim 5 wherein said polymer is selected from the group consisting of polyacrylates, polymethacrylates, and polyvinylacetate.

* * * * *